United States Patent
Hiratani et al.

[11] Patent Number: 6,018,001
[45] Date of Patent: Jan. 25, 2000

[54] PROCESS FOR PRODUCING CONTACT LENS WITH HYDROPHILIC SURFACE AND CONTACT LENS OBTAINED THEREBY

[75] Inventors: Haruyuki Hiratani; Tatsutoshi Nakajima, both of Kasugai, Japan

[73] Assignee: Menicon Co., Ltd., Aichi, Japan

[21] Appl. No.: 09/155,051

[22] PCT Filed: Jan. 19, 1998

[86] PCT No.: PCT/JP98/00153
§ 371 Date: Sep. 23, 1998
§ 102(e) Date: Sep. 23, 1998

[87] PCT Pub. No.: WO98/33089
PCT Pub. Date: Jul. 30, 1998

[30] Foreign Application Priority Data

Jan. 23, 1997 [JP] Japan ................................. 9-010225

[51] Int. Cl.[7] .................................................. C08F 8/12
[52] U.S. Cl. .................................. 525/326.2; 525/326.4; 525/326.5; 525/344; 525/355
[58] Field of Search .............................. 525/326.2, 326.4, 525/326.5, 344, 355

[56] References Cited

U.S. PATENT DOCUMENTS 5,155,194  10/1992  Kossmehl et al. .

FOREIGN PATENT DOCUMENTS

| 0 729 041 | 8/1996 | European Pat. Off. . |
| 5817412 | 2/1983 | Japan . |
| 58-176618 | 10/1983 | Japan . |
| 60-173518 | 6/1985 | Japan . |
| 7-013109 | 1/1995 | Japan . |
| 8-304746 | 11/1996 | Japan . |

*Primary Examiner*—Bernard Lipman
*Attorney, Agent, or Firm*—Browdy and Neimark

[57] ABSTRACT

A process for producing a contact lens having a hydrophilic surface comprising subjecting a contact lens material comprising a copolymer prepared by copolymerizing a monomer mixture containing a polymerizable monomer (A) which is at least one member selected from a sugar ketal-containing (meth)acrylate and a sugar glycerol ketal-containing (meth) acrylate, and a polymerizable monomer (B) which is copolymerizable with the polymerizable monomer (A) to acid treatment, wherein the polymerizable monomer (B) contains a hydrophobic monomer which is at least one member selected from a silicon-containing monomer, a fluorine-containing monomer and a silicon- and fluorine-containing monomer, and a contact lens which has high oxygen permeability and of which surface shows stably excellent hydrophilic property and which is excellent in deposit resistance at the same time.

8 Claims, No Drawings

PROCESS FOR PRODUCING CONTACT LENS WITH HYDROPHILIC SURFACE AND CONTACT LENS OBTAINED THEREBY

TECHNICAL FIELD

The present invention relates to a process for producing a contact lens having a hydrophilic surface and a contact lens produced by the process. More particularly, the present invention relates to a process for easily producing a contact lens which has high oxygen permeability, and of which surface shows stably excellent hydrophilic property for a long period of time, and which is excellent in deposit resistance such as lipid-deposit resistance, and relates to a contact lens having a hydrophilic surface, which is produced by the process.

BACKGROUND ART

In recent years, among various contact lenses, the demand for, in particular, contact lenses which can be continuously worn in eyes for a long period of time has become strong, so the development of various lenses has been proceeded.

As to the above contact lens which can be continuously worn in eyes for a long period of time, it is known that excellent affinity of lens materials for ocular tissues, in particular, cornea tissues is important, in addition to the importance of excellent oxygen permeability. Accordingly, there have been carried out various researches in a contact lens which has high oxygen permeability and shows stably excellent affinity for ocular tissues for a long period of time. However, a contact lens satisfying the above properties has not been provided yet.

In addition, lipid in lacrimal fluid easily adheres to, in particular, a water-absorptive contact lens, so there is a possibility that wearing comfort and transparency of the lens are lowered. Accordingly, it is desired that the lens is excellent in deposit resistance such as lipid-deposit resistance.

As a non-water-absorptive contact lens having a water content of at most about 5% by weight, conventionally, there has been widely spread a contact lens comprising a copolymer prepared by polymerizing, as a main component, a (meth)acrylate monomer or a silicon-containing monomer.

However, because such non-water-absorptive contact lens is substantially hydrophobic, the lens has defects that hydrophilic property of its surface is bad, its affinity for lacrimal fluid is poor and its wearing comfort is bad.

The present invention has been accomplished in consideration of the above prior art, and aims at providing a process for easily producing a contact lens which has high oxygen permeability and of which surface shows stably excellent hydrophilic property for a long period of time, and which is excellent in deposit resistance such as lipid-deposit resistance, and providing a contact lens having a hydrophilic surface, which is produced by the process.

DISCLOSURE OF THE INVENTION

The present invention relates to a process for producing a contact lens having a hydrophilic surface, characterized by subjecting a contact lens material comprising a copolymer prepared by copolymerizing a monomer mixture containing (A) a polymerizable monomer which is at least one member selected from a sugar ketal-containing (meth)acrylate and a sugar glycerol ketal-containing (meth)acrylate, and (B) a polymerizable monomer which is copolymerizable with the polymerizable monomer (A) to acid treatment, wherein said polymerizable monomer (B) contains a hydrophobic monomer (X1) which is at least one member selected from a silicon-containing monomer represented by the formula (I):

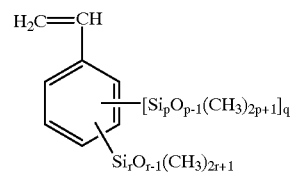

(I)

in which p is an integer of 1 to 15, q is 0 or 1, and r is an integer of 1 to 15;

a fluorine-containing monomer represented by the formula (II):

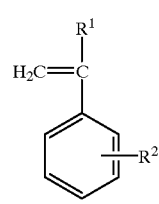

(II)

in which $R^1$ is hydrogen atom or methyl group, and $R^2$ is a fluoroalkyl group having 1 to 10 carbon atoms or a group represented by the formula:

$$-CH_2-O-(CH_2)_m-(CF_2)_n-CF_3$$

in which m is an integer of 1 to 3, and n is 0 or an integer of 1 to 7; and a silicon- and fluorine-containing monomer represented by the formula (III):

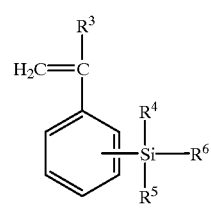

(III)

in which $R^3$ is hydrogen atom or methyl group, each of $R^4$ and $R^5$ is independently methyl group or $-O-Si(CH_3)_3$, and $R^6$ is a fluoroalkyl group having 1 to 10 carbon atoms, which may have ether bond; and a contact lens having a hydrophilic surface produced by the above process.

BEST MODE FOR CARRYING OUT THE INVENTION

In the present invention, a contact lens having a hydrophilic surface can be produced by subjecting a contact lens material comprising a copolymer prepared by copolymerizing a monomer mixture containing (A) a polymerizable monomer which is at least one member selected from a sugar ketal-containing (meth)acrylate and a sugar glycerol ketal-containing (meth)acrylate, and (B) a polymerizable monomer which is copolymerizable with the polymerizable monomer (A) to acid treatment. Also, in the present invention, the above polymerizable monomer (B) contains a hydrophobic monomer (X1) which is at least one member selected from a silicon-containing monomer represented by the formula (I):

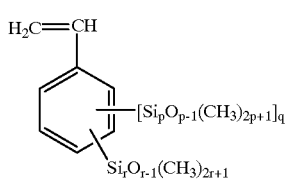

(I)

in which p is an integer of 1 to 15, q is 0 or 1, and r is an integer of 1 to 15;

a fluorine-containing monomer represented by the formula (II):

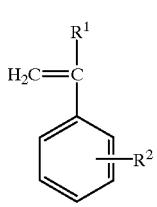

(II)

in which $R^1$ is hydrogen atom or methyl group, and $R^2$ is a fluoroalkyl group having 1 to 10 carbon atoms or a group represented by the formula:

in which m is an integer of 1 to 3, and n is 0 or an integer of 1 to 7; and a silicon- and fluorine-containing monomer represented by the formula (III):

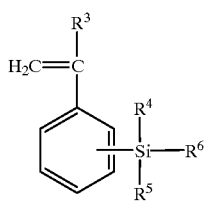

(III)

in which $R^3$ is hydrogen atom or methyl group, each of $R^4$ and $R^5$ is independently methyl group or —O—Si(CH$_3$)$_3$, and $R^6$ is a fluoroalkyl group having 1 to 10 carbon atoms, which may have ether bond.

In the process of the present invention, it is one of great characteristics that the polymerizable monomer (A) which is at least one member selected from a sugar ketal-containing (meth)acrylate and a sugar glycerol ketal-containing (meth)acrylate is used.

In the present specification, the terminology "... (meth)acrylate" means "... acrylate and/or ... methacrylate". The other (meth)acrylate derivative is the same meaning as this.

The above polymerizable monomer (A) is a component which imparts excellent hydrophilic property which is stable for a long period of time to the surface of a contact lens and improves deposit resistance of a contact lens at the same time.

Typical examples of the polymerizable monomer (A) are, for instance, a sugar ketal-containing (meth)acrylate such as 1.2:3.4-di-O-isopropylidene-6-O-(meth)acryloyl-D-galactopyranoside (another name "1.2:3.4-di-O-isopropylidene-6-(meth)acryloyl-D-galactose") or 1.2:5.6-di-O-isopropylidene-3-O-(meth)acryloyl-D-glycofuranoside (another name "1.2:5.6-di-O-isopropylidene-3-O-(meth)acryloyl-D-glucose"); a sugar glycerol ketal-containing (meth)acrylate such as 1.3-O-isopropylidene glycerol (meth)acrylate, 2.3-O-isopropylidene glycerol (meth)acrylate, 2-methyl-2-ethyl-4-(meth)acryloyloxymethyl-1.3-dioxolane, 2-methyl-2-isobutyl-4-(meth)acryloyloxy-1.3-dioxolane, 2-methyl-2-phenyl-4-(meth)acryloyloxymethyl- 1.3-dioxolane or 2-phenyl-4-(meth)acryloyloxymethyl-1.3-dioxolane; and the like. These can be used alone or in admixture thereof. Among them, 1.3-O-isopropylidene glycerol methacrylate and 2.3-O-isopropylidene glycerol methacrylate are particularly preferable from the viewpoint that effect of imparting hydrophilic property and effect of improving deposit resistance are great.

It is desired that the amount of the polymerizable monomer (A) is at least 1% by weight, preferably at least 3% by weight of the total amount of the monomer mixture, in order to sufficiently exhibit the effects of imparting hydrophilic property and improving deposit resistance, which are based on the use of the polymerizable monomer (A). It is desired that the amount of the polymerizable monomer (A) is at most 50% by weight, preferably at most 30% by weight of the total amount of the monomer mixture, in order to sufficiently exhibit the effect of improving oxygen permeability.

The monomer mixture used in the present invention contains, in addition to the above polymerizable monomer (A), the polymerizable monomer (B) which is copolymerizable with the polymerizable monomer (A). The polymerizable monomer (B) can form a contact lens material.

In the process of the present invention, it is one of great characteristics that the polymerizable monomer (B) contains a hydrophobic monomer (X1) which is at least one member selected from a silicon-containing monomer represented by the formula (I):

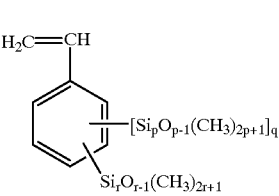

(I)

in which p is an integer of 1 to 15, q is 0 or 1, and r is an integer of 1 to 15;

a fluorine-containing monomer represented by the formula (II):

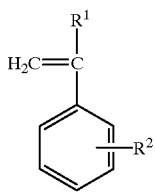

in which $R^1$ is hydrogen atom or methyl group, and $R^2$ is a fluoroalkyl group having 1 to 10 carbon atoms or a group represented by the formula:

in which m is an integer of 1 to 3, and n is 0 or an integer of 1 to 7; and a silicon- and fluorine-containing monomer represented by the formula (III):

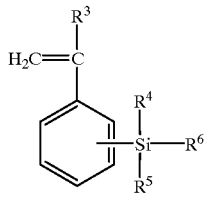

in which $R^3$ is hydrogen atom or methyl group, each of $R^4$ and $R^5$ is independently methyl group or —O—Si$(CH_3)_3$, and $R^6$ is a fluoroalkyl group having 1 to 10 carbon atoms, which may have ether bond.

The hydrophobic monomer (X1) is a component which improves oxygen permeability of a contact lens. Because the hydrophobic monomer (X1) is excellent in compatibility with the polymerizable monomer (A), copolymerization can be carried out in a good state, so that a contact lens having excellent transparency can be produced.

As to the silicon-containing monomer represented by the formula (I), when p or r in the formula (I) is an integer of at least 16, there are tendencies that it is difficult to purify and synthesize the monomer and that hardness of the produced contact lens is lowered. When q in the formula (I) is an integer of at least 2, there is a tendency that it is difficult to synthesize the silicon-containing monomer.

Typical examples of the silicon-containing monomer represented by the formula (I) are, for instance, tris(trimethylsiloxy)silylstyrene, bis(trimethylsiloxy)methylsilylstyrene, (trimethylsiloxy)dimethylsilylstyrene, tris(trimethylsiloxy)siloxydimethylsilylstyrene, [bis(trimethylsiloxy)methylsiloxy]dimethylsilylstyrene, heptamethyltrisiloxanylstyrene, nonamethyltetrasiloxanylstyrene, pentadecamethylheptasiloxanylstyrene, heneicosamethyldecasiloxanylstyrene, heptacosamethyltridecasiloxanylstyrene, trimethylsiloxypentamethyldisiloxymethylsilylstyrene, tris(pentamethyldisiloxy)silylstyrene, tris(trimethylsiloxy)siloxybis(trimethylsiloxy)silylstyrene, bis(heptamethyltrisiloxy)methylsilylstyrene, tri[methylbis(trimethylsiloxy)siloxy]silylstyrene, trimethylsiloxybis[tris(trimethylsiloxy)siloxy]silylstyrene, nonamethyltetrasiloxyundecylmethylpentasiloxymethylsilylstyrene, tris[tris(trimethylsiloxy)siloxy]silylstyrene, tris(trimethylsiloxyhexamethyl)tetrasiloxy-tris(trimethylsiloxy)siloxytrimethylsiloxysilylstyrene, nonakis(trimethylsiloxy)tetrasiloxanylstyrene, bis(tridecamethylhexasiloxy)methylsilylstyrene, and the like. These can be used alone or in admixture thereof.

Typical examples of the fluorine-containing monomer represented by the formula (II) are, for instance, 2,2,2-trifluoroethylstyrene, 2,2,3,3-tetrafluoropropylstyrene, 2,2,3,3-tetrafluoro-t-pentylstyrene, 2,2,3,4,4,4-hexafluorobutylstyrene, 2,2,3,4,4,4-hexafluoro-t-hexylstyrene, 2,2,3,3,4,4-hexafluorobutylstyrene, 2,2,2,2',2',2'-hexafluoroisopropylstyrene, 2,2,3,3,4,4,4-heptafluorobutylstyrene, 2,2,3,3,4,4,5,5-octafluoropentylstyrene, 2,2,3,3,4,4,5,5,5-nonafluoropentylstyrene, 4-vinylbenzyl-2',2'-2'-trifluoroethyl ether, 4-vinylbenzyl-3',3',3'-trifluoropropyl ether, 4-vinylbenzyl-4',4',4'-trifluorobutyl ether, 4-vinylbenzyl-2',2',3',3',3'-pentafluoropropyl ether, 4-vinylbenzyl-2',2',3',3',4',4',4'-heptafluorobutyl ether, 4-vinylbenzyl-3',3',4',4',5',5',6',6',6'-nonafluorohexyl ether, 4-vinylbenzyl-3',3',4',4',5',5',6',6',7',7',8',8',9'9,10',10',10'-heptadecafluorodecyl ether and the like. These can be used alone or in admixture thereof.

Typical examples of the silicon- and fluorine-containing monomer represented by the formula (III) are, for instance, a fluoroalkyldimethylsilylstyrene such as fluoromethyldimethylsilylstyrene, difluoromethyldimethylsilylstyrene, trifluoromethyldimethylsilylstyrene, fluoropropyldimethylsilylstyrene, fluorohexyldimethylsilylstyrene, difluorohexyldimethylsilylstyrene, trifluorohexyldimethylsilylstyrene, tetrafluorohexyldimethylsilylstyrene, pentafluorohexyldimethylsilylstyrene, hexafluorohexyldimethylsilylstyrene, heptafluorohexyldimethylsilylstyrene, octafluorohexyldimethylsilylstyrene, nonafluorohexyldimethylsilylstyrene, decafluorooctyldimethylsilylstyrene, tridecafluorooctyldimethylsilylstyrene, tetradecafluorooctyldimethylsilylstyrene or heptadecafluorooctyldimethylsilylstyrene;

a fluoroalkylbis[trimethylsiloxy]silylstyrene such as trifluoromethylbis[trimethylsiloxy]silylstyrene, heptafluoropropylbis[trimethylsiloxy]silylstyrene, decafluorooctylbis[trimethylsiloxy]silylstyrene, tridecafluorooctylbis[trimethylsiloxy]silylstyrene, tetradecafluorooctylbis[trimethylsiloxy]silylstyrene or heptadecafluorooctylbis[trimethylsiloxy]silylstyrene;

a fluoroalkylmethyltrimethylsiloxysilylstyrene such as trifluoromethylmethyltrimethylsiloxysilylstyrene, difluoromethylmethyltrimethylsiloxysilylstyrene, trifluoromethylmethyltrimethylsiloxysilylstyrene, heptafluoropropylmethyltrimethylsiloxysilylstyrene, tridecafluorohexylmethyltrimethylsiloxysilylstyrene, decafluoroocrylmethyltrimethylsiloxysilylstyrene, tridecafluorooctylmethyltrimethylsiloxysilylstyrene or heptadecafluorooctylmethyltrimethylsiloxysilylstyrene;

an alkoxy group-containing fluorostyrene derivative such as
trifluoromethoxydifluoromethyldimethylsilylstyrene, methoxydifluoromethyldimethylsilylstyrene, trifluoromethoxytetrafluoroethyldimethylsilylstyrene, heptafluoroethoxydifluoroethyldimethylsilylstyrene or trifluoromethoxydifluoromethylmethyltrimethylsiloxysilylstyrene; and the like. These can be used alone or in admixture thereof.

The hydrophobic monomer (X1) is, as mentioned above, at least one member selected from the silicon-containing monomer represented by the formula (I), the fluorine-containing monomer represented by the formula (II) and the silicon- and fluorine-containing monomer represented by the formula (III). However, part of the hydrophobic monomer (X1) can be varied to a compound such as a silicon-containing styrene derivative other than the above monomers, such as heptamethylcyclotetrasiloxanylstyrene, heptamethylcyclotetrasiloxybis(trimethylsiloxy)silylstyrene or tripropyltetramethylcyclotetrasiloxanylstyrene; or a fluorine-containing silicone such as $[(CH_3)_3SiO]_3Si(CH_2)_2$—$C(CF_3)_2$—O—CO—CH=$CH_2$, $[(CH_3)_3SiO]_3Si(CH_2)_2$—$C(CF_3)_2$—O—CO—$C(CH_3)$=$CH_2$, $[(CH_3)_3SiO]_3Si(CH_2)_3$—$C(CF_3)_2$—O—CO—CH=$CH_2$ or $[(CH_3)_3SiO]_3Si(CH_2)_3$—$C(CF_3)_2$—O—CO—$C(CH_3)$=$CH_2$.

It is desired that the amount of the hydrophobic monomer (X1) is at least 10% by weight, preferably at least 30% by weight of the total amount of the monomer mixture, in order to sufficiently improve oxygen permeability of a contact lens. It is desired that the amount of the hydrophobic monomer (X1) is at most 99% by weight, preferably at most 90% by weight of the total amount of the monomer mixture, in order to sufficiently exhibit the effects of imparting hydrophilic property and improving deposit resistance.

In the process of the present invention, in order to more improve deposit resistance of a contact lens, the polymerizable monomer (B) can contain, as a hydrophobic monomer, a fluoroalkyl (meth)acrylate (X2) having an alkyl group having 1 to 12 carbon atoms, in which at least one hydrogen atom is substituted with fluorine atom.

Typical examples of the fluoroalkyl (meth)acrylate (X2) are, for instance, 2,2,2-trifluoroethyl (meth)acrylate, 2,2,3,3-tetrafluoropropyl (meth)acrylate, 2,2,3,3-tetrafluoro-t-pentyl (meth)acrylate, 2,2,3,4,4,4-hexafluorobutyl (meth)acrylate, 2,2,3,4,4,4-hexafluoro-t-hexyl (meth)acrylate, 2,3,4,5,5,5-hexafluoro-2,4-bis(trifluoromethyl)pentyl (meth)acrylate, 2,2,3,3,4,4-hexafluorobutyl (meth)acrylate, 2,2,2,2',2',2'-hexafluoroisopropyl (meth)acrylate, 2,2,3,3,4,4,4-heptafluorobutyl (meth)acrylate, 2,2,3,3,4,4,5,5-octafluoropentyl (meth)acrylate, 2,2,3,3,4,4,5,5,5-nonafluoropentyl (meth)acrylate, 2,2,3,3,4,4,5,5,6,6,7,7-dodecafluoroheptyl (meth)acrylate, 3,3,4,4,5,5,6,6,7,7,8,8-dodecafluorooctyl (meth)acrylate, 3,3,4,4,5,5,6,6,7,7,8,8,8-tridecafluorooctyl (meth)acrylate, 2,2,3,3,4,4,5,5,6,6,7,7,7-tridecafluoroheptyl (meth)acrylate, 3,3,4,4,5,5,6,6,7,7,8,8,9,9,10,10-hexadecafluorodecyl (meth)acrylate, 3,3,4,4,5,5,6,6,7,7,8,8,9,9,11,10,10-heptadecafluorodecyl (meth)acrylate, 3,3,4,4,5,5,6,6,7,7,8,8,9,9,10,10,11,11,-octadecafluoroundecyl (meth)acrylate, 3,3,4,4,5,5,6,6,7,7,8,8,9,9,10,10,11,11,11-nonadecafluoroundecyl (meth)acrylate, 3,3,4,4,5,5,6,6,7,7,8,8,9,9,10,10,11,11,12,12-eicosafluorododecyl (meth)acrylate and the like. These can be used alone or in admixture thereof.

It is desired that the amount of the fluoroalkyl (meth)acrylate (X2) is at least 1% by weight, preferably at least 5% by weight of the total amount of the monomer mixture, in order to sufficiently exhibit the effect of improving deposit resistance of a contact lens. It is desired that the amount of the fluoroalkyl (meth)acrylate (X2) is at most 90% by weight, preferably at most 80% by weight of the total amount of the monomer mixture, in order to sufficiently exhibit the effect of imparting hydrophilic property.

In the process of the present invention, in order to adjust hardness of a contact lens and improve mechanical strength of a contact lens, the polymerizable strength of a contact lens, the polymerizable monomer (B) may contain a hydrophobic monomer (X3) other than the above hydrophobic monomer(X1) and the fluoroalkyl (meth)acrylate (X2).

Typical examples of the hydrophobic monomer (X3) are, for instance, a linear, branched or cyclic alkyl (meth)acrylate such as methyl (meth)acrylate, ethyl (meth)acrylate, isopropyl (meth)acrylate, n-propyl (meth)acrylate, isobutyl (meth) acrylate, n-butyl (meth)acrylate, t-butyl (meth)acrylate, 2-ethylhexyl (meth)acrylate, n-octyl (meth)acrylate, n-decyl (meth)acrylate, n-dodecyl (meth)acrylate, n-pentyl (meth) acrylate, t-pentyl (meth)acrylate, hexyl (meth)acrylate, heptyl (meth)acrylate, nonyl (meth)acrylate, stearyl (meth) acrylate, cyclopentyl (meth)acrylate or cyclohexyl (meth) acrylate; an alkoxyalkyl (meth)acrylate such as 2-ethoxyethyl (meth)acrylate, 3-ethoxypropyl (meth) acrylate, 2-methoxyethyl (meth)acrylate or 3-methoxypropyl (meth)acrylate; an alkylthioalkyl (meth) acrylate such as ethylthioethyl (meth)acrylate or methylthioethyl (meth)acrylate; styrene; α-methylstyrene; an alkylstyrene such as methylstyrene, ethylstyrene, propylstyrene, butylstyrene, t-butylstyrene, isobutylstyrene or pentylstyrene; an alkyl-α-methylstyrene such as methyl-α-methylstyrene, ethyl-α-methylstyrene, propyl-α-methylstyrene, butyl-α-methylstyrene, t-butyl-α-methylstyrene, isobutyl-α-methylstyrene or pentyl-α-methylstyrene; a silicon-containing (meth)acrylate such as trimethylsiloxydimethylsilylmethyl (meth)acrylate, trimethylsiloxydimethylsilylpropyl (meth)acrylate, methylbis(trimethylsiloxy)silylpropyl (meth)acrylate, tris(trimethylsiloxy)silylpropyl (meth)acrylate, mono[methylbis(trimethylsiloxy)siloxy]bis(trimethylsiloxy) silylpropyl (meth)acrylate, tris[methylbis(trimethylsiloxy)siloxy]silylpropyl (meth)acrylate, methylbis(trimethylsiloxy)silylpropylglyceryl (meth)acrylate, tris(trimethylsiloxy)silylpropylglyceryl (meth)acrylate, mono[methylbis(trimethylsiloxy)siloxy]bis(trimethylsiloxy) silylpropylglyceryl (meth)acrylate, trimethylsilylethyltetramethyldisiloxypropylglyceryl (meth) acrylate, trimethylsilylmethyl (meth)acrylate, trimethylsilylpropyl (meth)acrylate, trimethylsilylpropylglyceryl (meth) acrylate, trimethylsiloxydimethylsilylpropylglyceryl (meth) acrylate, methylbis(trimethylsiloxy) silylethyltetramethyldisiloxymethyl (meth)acrylate, tetramethyltriisopropylcyclotetrasiloxanylpropyl (meth) acrylate or tetramethyltripropylcyclotetrasiloxybis(trimethylsiloxy)silyipropyl (meth)acrylate; and the like. These can be used alone or in admixture thereof.

It is desired that the amount of the hydrophobic monomer (X3) is at least 0.1% by weight, preferably at least 0.5% by weight of the total amount of the monomer mixture, in order to sufficiently exhibit the effects of adjusting hardness and improving mechanical strength, which are based on the use of the hydrophobic monomer (X3). It is desired hat the amount of the hydrophobic monomer (X3) is at most 70% by eight, preferably at most 50% by weight of the total amount of the monomer mixture, in order to sufficiently exhibit the effects of imparting hydrophilic property and improving deposit resistance.

In the process of the present invention, in order to impart water-absorptive property to a contact lens and more improve hydrophilic property of the surface of a contact lens, the polymerizable monomer (B) can contain a hydrophilic monomer (Y).

Typical examples of the hydrophilic monomer (Y) are, for instance, a hydroxyl group-containing (meth)acrylate such as hydroxyethyl (meth)acrylate, hydroxypropyl (meth) acrylate, hydroxybutyl (meth)acrylate, dihydroxypropyl (meth)acrylate, dihydroxybutyl (meth)acrylate, diethylene glycol mono(meth)acrylate, triethylene glycol mono(meth) acrylate, propylene glycol mono(meth)acrylate or dipropylene glycol mono(meth)acrylate; (meth)acrylic acid; a (meth)acrylamide monomer such as (meth)acrylamide, N-methyl(meth)acrylamide, N-ethyl(meth)acrylamide, N,N-dimethyl(meth)acrylamide, N,N-diethyl(meth) acrylamide or N,N-methylethyl(meth)acrylamide; a vinyl lactam such as N-vinylpyrrolidone, N-vinylpiperidone, N-vinylcaprolactam or N-vinylcapryllactam; an aminoalkyl (meth)acrylate such as aminoethyl (meth)acrylate, N-methylaminoethyl (meth)acrylate, N,N-dimethylaminoethyl (meth)acrylate or 2-butylaminoethyl (meth)acrylate; an alkoxyl group-containing (meth)acrylate such as methoxyethyl (meth)acrylate, ethoxyethyl (meth) acrylate or methoxydiethylene glycol (meth)acrylate; maleic anhydride; maleic acid; fumaric acid; a fumaric acid derivative; aminostyrene; hydroxystyrene; and the like. These can be used alone or in admixture thereof. Among them, because the effect of improving hydrophilic property is great, at least one member selected from (meth)acrylic acid, a (meth) acrylamide monomer and a vinyl lactam is preferable.

It is desired that the amount of the hydrophilic monomer (Y) is at least 0.1% by weight, preferably at least 0.5% by weight of the total amount of the monomer mixture, in order to sufficiently exhibit the effect of improving hydrophilic property. It is desired that the amount of the hydrophilic monomer (Y) is at most 20% by weight, preferably at most 15% by weight of the total amount of the monomer mixture, in order to sufficiently exhibit the effect of improving oxygen permeability and deposit resistance.

The process of the present invention can be preferably used for producing a non-water-absorptive contact lens having a water content of at most about 5% by weight, which is bad in hydrophilic property. It is desired that the above hydrophobic monomer (X) ((X1)–(X3)) and the above hydrophilic monomer (Y) which are examples of the polymerizable monomer (B) are suitably selected so that the non-water-absorptive contact lens can be preferably produced.

In the process of the present invention, in order to improve mechanical strength of a contact lens and impart durability to a contact lens, the polymerizable monomer (B) can contain a crosslinkable monomer (Z).

Typical examples of the crosslinkable monomer (Z) are, for instance, ethylene glycol di(meth)acrylate, diethylene glycol di(meth)acrylate, triethylene glycol di(meth)acrylate, propylene glycol di(meth)acrylate, dipropylene glycol di(meth)acrylate, diallyl fumarate, allyl (meth)acrylate, vinyl (meth)acrylate, trimethylolpropane tri(meth)acrylate, methacryloyloxyethyl (meth)acrylate, divinylbenzene, diallyl phthalate, diallyl adipate, triallyldiisocyanate, α-methylene-N-vinylpyrrolidone, 4-vinylbenzyl (meth) acrylate, 3-vinylbenzyl (meth)acrylate, 2,2-bis((meth) acryloyloxyphenyl)hexafluoropropane, 2,2-bis((meth) acryloyloxyphenyl)propane, 1,4-bis(2-(meth) acryloyloxyhexafluoroisopropyl)benzene, 1,3-bis(2-(meth) acryloyloxyhexafluoroisopropyl)benzene, 1,2-bis(2-(meth) acryloyloxyhexafluoroisopropyl)benzene, 1,4-bis(2-(meth) acryloyloxyisopropyl)benzene, 1,3-bis(2-(meth) acryloyloxyisopropyl)benzene, 1,2-bis(2-(meth) acryloyloxyisopropyl)benzene and the like. These can be used alone or in admixture thereof.

It is desired that the amount of the crosslinkable monomer (Z) is at least 0.01% by weight, preferably at least 0.05% by weight of the total amount of the monomer mixture, in order to sufficiently exhibit the effects of improving mechanical strength and imparting durability. It is desired that the amount of the crosslinkable monomer (Z) is at most 10% by weight, preferably at most 7% by weight of the total amount of the monomer mixture, in order to prevent a contact lens from becoming brittle.

In the process of the present invention, at first, the monomer mixture containing the polymerizable monomer (A) and the polymerizable monomer (B) is copolymerized to give a copolymer.

In order to copolymerize the monomer mixture, usual polymerization methods can be employed. For instance, after a radical polymerization initiator is added to the monomer mixture to give a mixture, the mixture is gradually heated within the range of room temperature to about 130° C., or the mixture is irradiated with electromagnetic wave such as microwave, ultraviolet ray or radiation ($\gamma$ ray). During the thermal polymerization, the temperature of the mixture may be raised stepwise. The copolymerization may be carried out by a bulk polymerization method, a solution polymerization method using a solvent or the other polymerization method.

Typical examples of the radical polymerization initiator are, for instance, azobisisobutyronitrile, azobisdimethylvaleronitrile, benzoyl peroxide, t-butyl hydroperoxide, cumene hydroperoxide and the like. These can be used alone or in admixture thereof. In the case that the copolymerization is carried out utilizing electromagnetic wave, it is desired that a photopolymerization initiator and a polymerization sensitizer are further added to the above mixture. It is desired that the amount of the photopolymerization initiator and the polymerization sensitizer is 0.002 to 2 parts by weight (hereinafter referred to as part(s)), preferably 0.01 to 1 part based on 100 parts of the total amount of the monomer mixture.

The thus obtained copolymer is formed into a contact lens shape.

A method for forming the copolymer into a contact lens shape is not particularly limited. Various forming methods which are usually used by a person skilled in the art can be employed. Examples of the forming method are, for instance, a cutting and processing method, a molding method and the like. In the cutting and processing method, after the above copolymerization is carried out in a suitable mold or container to give a material (copolymer) having a shape of bar, block or plate, the material is formed into the desired shape by mechanical process such as cutting process or polishing process. In the molding method, the above monomer mixture is copolymerized in a mold having a shape corresponding to the desired contact lens shape to give a molded article (contact lens mateiral), and then, as occasion demands, the molded article is subjected to mechanical finishing process. A combined method of the cutting and processing method with the molding method can be also employed.

In the present invention, in addition to these methods, a method disclosed in Japanese Unexamined Patent Publication No. 278041/1987 and Japanese Unexamined Patent Publication No. 11854/1989 can be employed. In this method, a hard polymer is impregnated with a copolymerizable component for a lens material and then, the copolymerizable component is copolymerized to give a material which is further hardened as a whole. The material is subjected to cutting process to give a molded article having the desired shape and then, the above hard polymer is removed from the molded article to give a molded article (contact lens material) comprising a lens material.

The thus obtained contact lens material is subjected to acid treatment, so that the contact lens having a hydrophilic surface of the present invention can be produced.

That is, the above contact lens material composed of the copolymer is subjected to acid treatment with each of organic acids and inorganic acids, so that ketal group in the copolymer is converted into hydroxyl group (so-called deketal reaction). For instance, as shown by the following reaction formula, isoprpylidene group is removed by the hydrolysis, so that hydrophilic property is imparted to the copolymer.

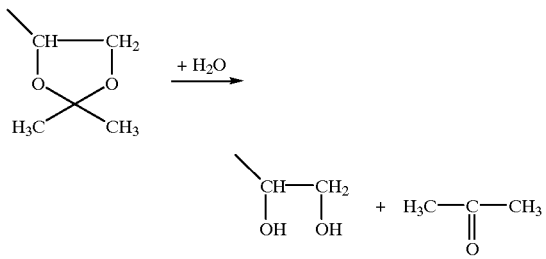

In the process of the present invention, the contact lens material is subjected to acid treatment. The contact lens material may be a copolymer prepared by copolymerizing the monomer mixture, which has a shape of block, plate or bar and which is not formed into the desired shape, and may be a processed article produced from the copolymer by the cutting and processing method and/or molding method, which has the desired contact lens shape.

Examples of an acid used for the acid treatment are, for instance, hydrochloric acid, sulfuric acid, phosphoric acid, acetic acid, formic acid, trifluoroacetic acid and the like. In the case that concentration of the acid used for the acid treatment is high, there are dangers that a contact lens material becomes an inferior material and that crack is generated in a contact lens material. Accordingly, the acid treatment may be carried out by increasing concentration of the acid in a treating solution gradually or stepwise. The suitable acid content of the treating solution and the suitable immersing time of a contact lens material vary according to quality of a non-treated contact lens material and kind of the acid, so they cannot be unconditionally defined. It is preferred that, in general, the contact lens material is subjected to the acid treatment using the treating solution having an acid content of about 0.1 to 99 w/v % at room temperature for about 1 minute to 24 hours. In the case that the non-treated contact lens material comprises a copolymer prepared without using a hydrophilic monomer and is not impregnated with a humectant, crack is easily generated in the contact lens material due to excitement of a sudden deketal reaction. Accordingly, the acid treatment may be carried out, in particular, by increasing concentration of the acid in the treating solution gradually or stepwise.

The reaction in the acid treatment is not strictly limited to a standard treating method and a standard treating time. This acid treatment can be reproducibly carried out within a constant permissible range, so it can be particularly utilized industrially.

The thus acid treated contact lens may be subjected to neutralization treatment by immersing in an alkaline aqueous solution such as sodium carbonate aqueous solution, or can be subjected to immersing treatment or boiling treatment in water or physiological sodium chloride solution.

As mentioned above, in accordance with the process of the present invention, there can be easily produced a contact lens which has high oxygen permeability, and of which surface shows stably excellent hydrophilic property for a long period of time, and which is excellent in deposit resistance such as lipid-deposit resistance.

The process for producing a contact lens having a hydrophilic surface and the contact lens produced by the process of the present invention are more specifically explained by means of the following Examples, and it is to be understood that the present invention is not limited to the Examples.

EXAMPLES 1 TO 6 AND COMPARATIVE EXAMPLE 1

A monomer mixture and a polymerization initiator which were shown in TABLE 1 were mixed and dissolved with each other to give a mixture. The mixture was dropped into a test tube and then, the copolymerization was carried out at 30° C. for 16 hours, at 40° C. for 24 hours and at 50° C. for 8 hours in a constant temperature water bath. Then, the curing was carried out at 50° C. for 5 hours in a circulating drier, and then followed with raising the temperature of the content in the test tube from 50° to 120° C. at a rate of 10° C./1.5 hours. Furthermore, after the annealing treatment was carried out at 120° C. for 1 hour, the content in the test tube was gradually cooled to room temperature to give a transparent copolymer having a shape of bar. The copolymer was cut into a contact lens shape by an ordinary method to give a test piece having a thickness of 0.2 mm and a test piece having a thickness of 4 mm.

Then, the acid treatment was carried out by immersing the test piece in HCl solution having a concentration of 6 mol/l for 1 hour, so that ketal group in the copolymer was converted into hydroxyl group (deprotection). The acid treated test piece was observed with naked eyes. As a result, the test piece was colorless and transparent.

Then, physical properties of the test pieces produced in EXAMPLES 1 to 6 were examined in accordance with the following methods. The results are shown in TABLE 2.

(1) Oxygen Permeability

Using Seikaken-type film oxygen-gas permeator made by RIKASEIKI KOGYO CO., LTD., oxygen permeability of the acid treated test piece having a thickness of 0.2 mm was measured in physiological sodium chloride solution at 35° C.

The unit of oxygen permeability is $(cm^2/sec).(mlO_2/(ml \cdot mmHg))$, and the numerical value shown in TABLE 2 was obtained by multiplying the original value by $10^{11}$ times.

(2) Contact Angle

Before the acid treatment, just after the acid treatment or after allowing for stand for 1 week in an atmosphere (room temperature), contact angle (degree) of the test piece having a thickness of 4 mm was measured at 25° C. by air-bubble method.

Each code listed in TABLE 1 shows the following compound.

IPGMA: 2.3-O-Isopropylidene glycerol methacrylate
SiSt: Tris(trimethylsiloxy)silylstyrene
6FP: 2,2,2,2',2',2'-Hexafluoroisopropyl methacrylate
N-VP: N-Vinyl-2-pyrrolidone
MAA: Methacrylic acid
VBMA: 4-Vinylbenzyl methacrylate
EDMA: Ethylene glycol dimethacrylate V-65: 2,2'-Azobis(2,4-dimethylvaleronitrile)

TABLE 1

| EXAMPLE NO. | Polymerizable monomer (A) | Monomer mixture (parts) | | | | | | Polymerization initiator part/100 parts of total amount of monomer mixture |
|---|---|---|---|---|---|---|---|---|
| | | Polymerizable monomer (B) | | | | | | |
| | | Hydrophobic monomer (X) | | Hydrophilic monomer (Y) | | Crosslinkable monomer (Z) | | |
| | IPGMA | SiSt | 6FP | N-VP | MAA | VBMA | EDMA | V-65 |
| 1 | 5 | 51 | 54 | — | — | 6 | 1 | 0.1 |
| 2 | 10 | 46 | 54 | — | — | 6 | 1 | 0.1 |
| 3 | 10 | 60 | 40 | — | — | 6 | 1 | 0.1 |
| 4 | 10 | 70 | 30 | — | — | 6 | 1 | 0.1 |
| 5 | 20 | 46 | 44 | — | — | 6 | 1 | 0.1 |
| 6 | 10 | 46 | 44 | 5 | 5 | 6 | 1 | 0.1 |
| COM. EX. 1 | — | 46 | 54 | 5 | 5 | 6 | 1 | 0.1 |

TABLE 2

| | Physical properties of test piece | | | |
|---|---|---|---|---|
| | | Contact angle (degree) | | |
| EXAMPLE NO. | Oxygen permeability | Before acid treatment | Just after acid treatment | After allowing for stand for 1 week |
| 1 | 114 | 86 | 40 | 52 |
| 2 | 114 | 72 | 26 | 42 |
| 3 | 115 | 81 | 25 | 38 |
| 4 | 120 | 84 | 28 | 38 |
| 5 | 89 | 78 | 24 | 37 |
| 6 | 94 | 58 | 18 | 20 |

From the results shown in TABLE 2, it can be understood that all test pieces produced in EXAMPLES 1 to 6 have high oxygen permeability. It can be understood that contact angle of each test piece, measured just after acid treatment is remarkably smaller than contact angle measured before acid treatment, so excellent hydrophilic property is imparted to each test piece. Furthermore, it can be understood that though each test piece is allowed to stand for 1 week, contact angle of each test piece does not very increase, and excellent hydrophilic property of each test piece is maintained.

Then, lipid-deposit resistance of the acid treated test pieces produced in EXAMPLE 2 and COMPARATIVE EXAMPLE 1 was measured in accordance with the following method.

(3) Lipid-deposit Resistance

There were mixed 0.3 g of oleic acid, 0.3 g of linolic acid, 4.0 g of tripalmitin, 1.0 g cetyl alcohol, 0.3 g of palmitic acid, 4.0 g of spermaceti, 0.4 g of cholesterol, 0.4 g of cholesterol palmitate and 14.0 g of yolk lecithin with each other to give an artificial ocular lipid (buffer solution of pH 7). The acid treated test piece "Ss" was immersed in the artificial ocular lipid at 37° C. for 5 hours and washed with flowing water. Then, lipid which adhered to the test piece "Ss" was extracted with 1 ml of a mixture solution of ethanol with ether (ethanol: ether=3:1 (volume ratio)) to give a lipid extract. To 500 μl of the lipid extract was added 1 ml of concentrated sulfuric acid and then, 3 mg of vanillin and 2 ml of phosphoric acid were added thereto to give an extract mixture. Then, using a spectrophotometer (made by Japan Spectroscopic Co., Ltd., UV-3100), absorbance of the extract mixture at a wavelength of 540 nm was measured. The absorbance was shown as "As".

As to the acid treated test piece "Sc" which was not immersed in the artificial ocular lipid, the extraction of lipid and the measurement of absorbance were carried out in the same manner as to the acid treated test piece "Ss" which was immersed in the artificial ocular lipid. The absorbance was shown as "Ac".

The adhering lipid amount per unit weight (Q (mg/g)) was calculated in accordance with the following equation.

$$Q = 12.1654 (Ks-Kc) - 0.0523$$

In the above equation, $$Ks \text{ is } \frac{\text{Absorbance ``As''}}{\text{Weight of acid treated test piece ``Ss'' (g)}}$$

and $$Kc \text{ is } \frac{\text{Absorbance ``Ac''}}{\text{Weight of acid treated test piece ``Sc'' (g)}}$$

As a result, the adhering lipid amount of the test piece in EXAMPLE 2 was 0.114 mg/cm$^2$, compared to 0.240 mg/cm$^2$ in COMPARATIVE EXAMPLE 1. The amount in EXAMPLE 2 was at most half the amount in COMPARATIVE EXAMPLE 1. From these results, it can be understood that the test piece produced in accordance with the process of the present invention in EXAMPLE 2 is extremely excellent in lipid-deposit resistance.

INDUSTRIAL APPLICABILITY

In accordance with the process of the present invention there can be easily produced a contact lens which has high oxygen permeability, and of which surface shows stably excellent hydrophilic property for a long period of time, and which is excellent in deposit resistance such as lipid-deposit resistance.

Because the contact lens having a hydrophilic surface of the present invention, which is produced by the above process has the above properties at the same time, it can be utilized as various contact lenses, particularly as non-water-absorptive contact lenses.

We claim:

1. A process for producing a contact lens having a hydrophilic surface, characterized by
    subjecting a contact lens material comprising a copolymer prepared by copolymerizing a monomer mixture containing (A) a polymerizable monomer which is at least one member selected from a sugar ketal-containing (meth)acrylate and a sugar glycerol ketal-containing (meth)acrylate, and (B) a polymerizable monomer which is copolymerizable with the polymerizable monomer (A)

to acid treatment, wherein said polymerizable monomer (B) contains a hydrophobic monomer (X1) which is at least one member selected from a silicon-containing monomer represented by the formula (I):

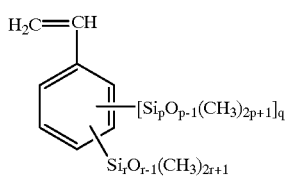

(I)

in which p is an integer of 1 to 15, q is 0 or 1, and r is an integer of 1 to 15;

a fluorine-containing monomer represented by the formula (II):

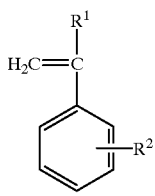

(II)

in which $R^1$ is hydrogen atom or methyl group, and $R^2$ is a fluoroalkyl group having 1 to 10 carbon atoms or a group represented by the formula:

in which m is an integer of 1 to 3, and n is 0 or an integer of 1 to 7; and a silicon- and fluorine-containing monomer represented by the formula (III):

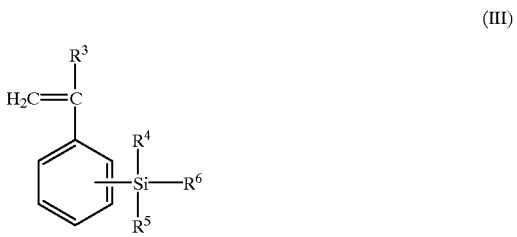

(III)

in which $R^3$ is hydrogen atom or methyl group, each of $R^4$ and $R^5$ is independently methyl group or $-O-Si(CH_3)_3$, and $R^6$ is a fluoroalkyl group having 1 to 10 carbon atoms, which may have ether bond.

2. The process of claim 1, wherein said polymerizable monomer (A) is 1.3-O-isopropylidene glycerol methacrylate or 2.3-O-isopropylidene glycerol methacrylate.

3. The process of claim 1, wherein said polymerizable monomer (B) contains a fluoroalkyl (meth)acrylate (X2) having an alkyl group having 1 to 12 carbon atoms, in which at least one hydrogen atom is substituted with fluorine atom.

4. The process of claim 1, wherein said polymerizable monomer (B) contains a hydrophilic monomer (Y).

5. The process of claim 4, wherein said hydrophilic monomer (Y) is at least one member selected from (meth)acrylic acid, a (meth)acrylamide monomer and a vinyl lactam.

6. The process of claim 1, wherein said polymerizable monomer (B) contains a crosslinkable monomer (Z).

7. A contact lens having a hydrophilic surface produced by the process of claim 1.

8. The contact lens of claim 7, which shows non-water-absorptive property.

* * * * *